Figure 1:
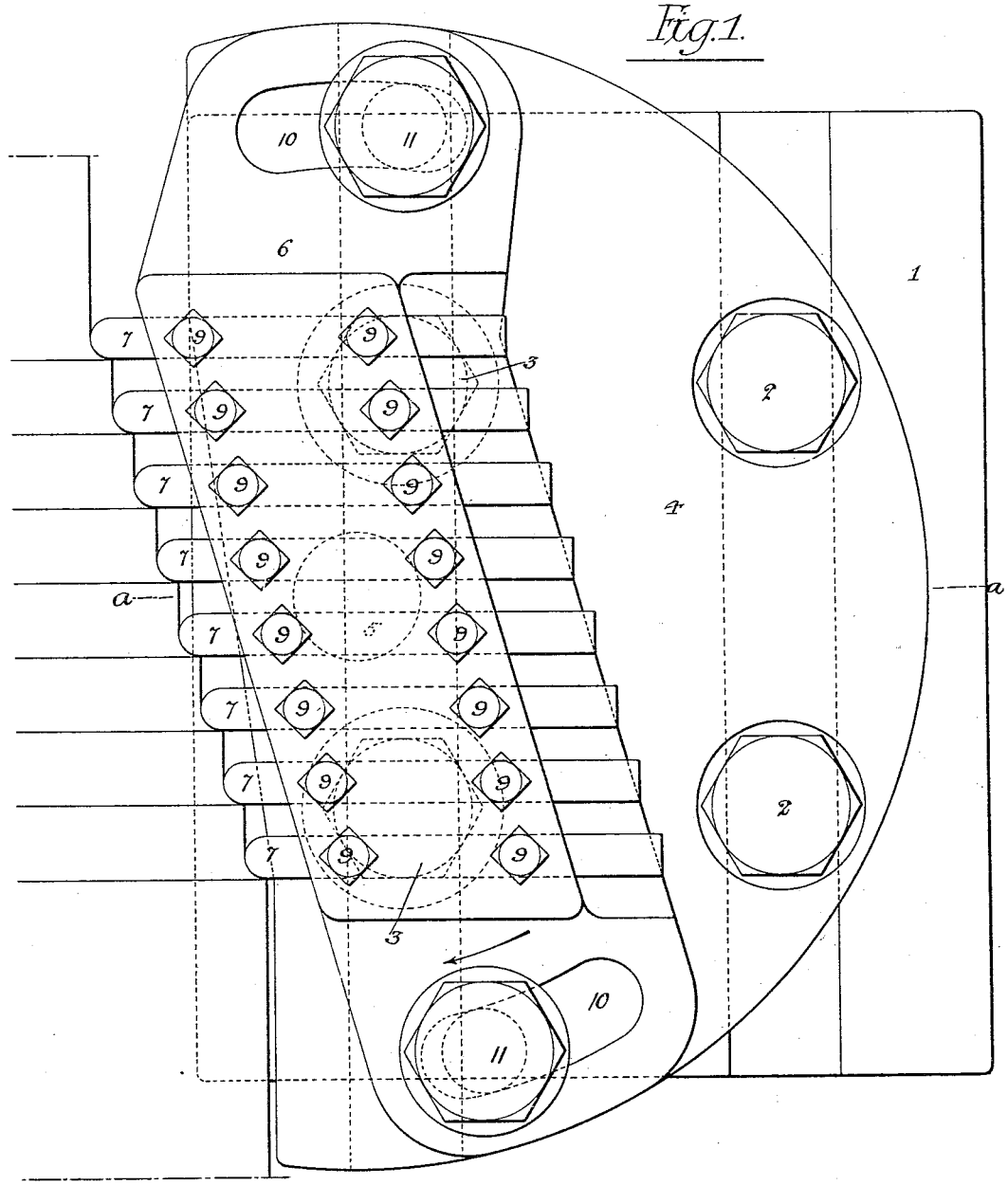

No. 745,976. PATENTED DEC. 1, 1903.
A. TINDEL.
METAL WORKING TOOL.
APPLICATION FILED APR. 28, 1902.
NO MODEL. 2 SHEETS—SHEET 1.

Witnesses:
Hamilton D. Turner
Herman E. Metius.

Inventor:-
Adam Tindel,
by his Attorneys

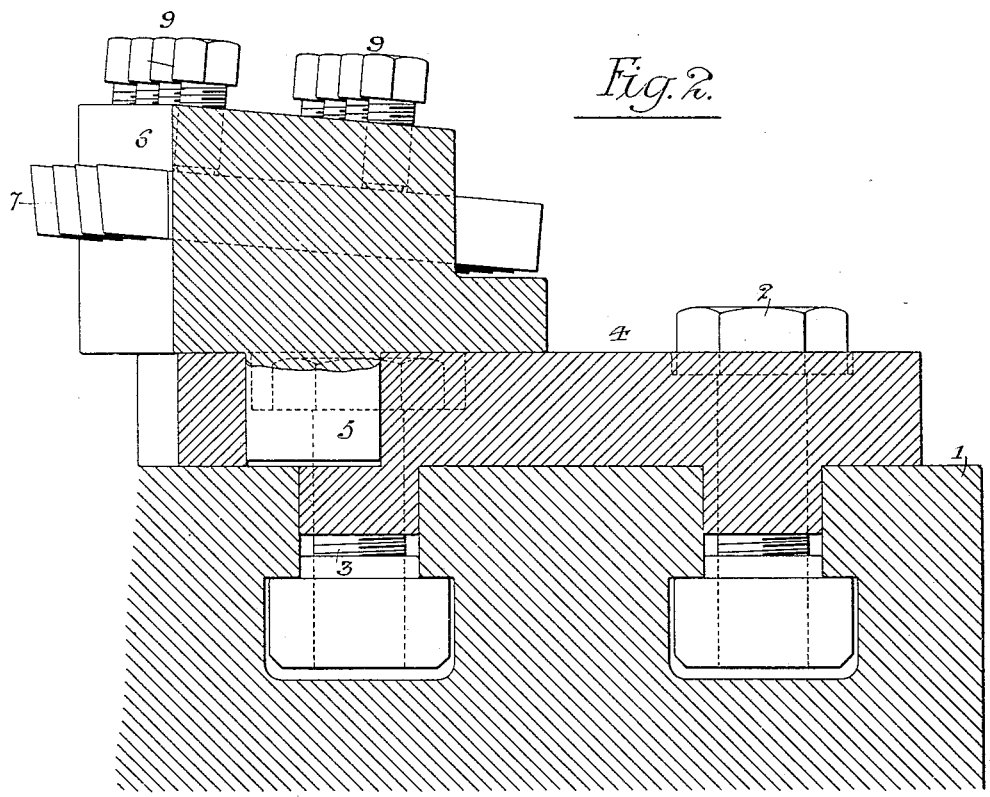

No. 745,976.                                           Patented December 1, 1903.

UNITED STATES PATENT OFFICE.

ADAM TINDEL, OF PHILADELPHIA, PENNSYLVANIA, ASSIGNOR TO TINDEL-MORRIS COMPANY, OF EDDYSTONE, PENNSYLVANIA, A CORPORATION OF PENNSYLVANIA.

METAL-WORKING TOOL.

SPECIFICATION forming part of Letters Patent No. 745,976, dated December 1, 1903.

Application filed April 28, 1902. Serial No. 105,053. (No model.)

*To all whom it may concern:*

Be it known that I, ADAM TINDEL, a citizen of the United States, residing in Philadelphia, Pennsylvania, have invented certain Improvements in Metal-Working Tools, of which the following is a specification.

My invention relates to metal-working machines—such as turning, facing, planing, slotting, and shaping machines—the object of my invention being to so construct such a machine as to permit heavy cuts to be made without undue strain either upon the work or upon the tool and to provide for readily changing the depth of cut of the tool and of its cutting elements one in respect to the other.

In the accompanying drawings, Figure 1 is a plan view of a tool-holder for a lathe constructed in accordance with my invention; and Fig. 2 is a transverse section of the same on the line $a\ a$, Fig. 1.

1 represents a slide intended to be mounted upon the bed-plate of the lathe, so as to be traversed longitudinally thereon in the usual manner. This slide is grooved longitudinally for the reception of two sets of bolts 2 and 3, provided with appropriate nuts and serving to secure vertically to said slide a plate 4, to which is pivoted, by means of a central depending pin 5, a tool-holder consisting of a bar 6, slotted transversely for the reception of a series of cutting-tools 7, which can be advanced and retracted in the tool-holder and can be firmly secured in position after adjustment by means of clamping-bolts 9.

In the opposite end portions of the tool-holder are formed segmental slots 10 for the reception of clamping-bolts 11, which are adapted to threaded openings in the plate 4 and serve to secure the tool-holder to said plate in any position of angular adjustment of the same within the limits permitted by the slots 10.

Supposing that each of the series of cutting-tools 7 projects to the same extent from the face of the tool-holder 6, the extent to which each tool will project beyond the next toward the axis of the lathe will depend upon the angular adjustment of the tool-carrier in respect to said axis. For instance, if it is adjusted to the position shown in Fig. 1 the depth of cut made by each tool in a shaft or other object which is being turned will be that indicated in said figure, and by swinging the tool-holder in the direction of the arrow, Fig. 1, so that it becomes more and more nearly parallel with the axis of the shaft, the depth of cut of the successive tools one in respect to another will be reduced accordingly. While the aggregate depth of cut can thus be regulated, as desired, the strain upon the tools and tool-holder is distributed uniformly throughout the entire series of tools, and the strain upon the work is likewise distributed over a large area. Hence a deep cut can be taken more readily than when but a single tool is employed, and the operation of the lathe can be expedited accordingly.

The use of a plate 4, interposed between the slide 1 and the tool-holder 6 and to which said tool-holder is pivoted, permits of the longitudinal adjustment of the tool-holder in respect to the slide without deranging the pivotal connection of the holder.

Having thus described my invention, I claim and desire to secure by Letters Patent—

1. The combination of a tool-slide having a plurality of undercut slots, a plate mounted thereon having bolts with heads constructed to enter and be retained in said slots, a tool-holder having a downwardly-projecting piece entering a recess in the plate whereby it is pivotally supported thereon and a series of tools carried by the holder, and projecting in a plane at right angles to the axis of the pivot-piece of the tool-holder, with means whereby said holder may be clamped in any desired position after having been moved on said pivot, substantially as described.

2. The combination of a tool-slide, a plate mounted thereon, a tool-holder consisting of a piece having a pivotal connection with said plate and slotted transversely, a series of tools carried in the slots and extending in a plane parallel to the plane of motion of the holder, said holder extending on both sides of its pivot and having at each end a slotted lug, and bolts passing through said slots engaging the supporting-plate whereby the tool-holder may be retained in any desired position, substantially as described.

3. The combination of a tool-slide, a plate mounted thereon, a tool-holder provided with means for movably supporting it on said plate and having retaining means independent of said supporting means whereby it may be clamped in an adjusted position, tools carried by said holder and projecting therefrom, one in advance of the other, in a plane parallel to the plane of motion of said plate, said tool-holder projecting bodily in a line substantially parallel to a line joining the ends of the tools, substantially as described.

In testimony whereof I have signed my name to this specification in the presence of two subscribing witnesses.

ADAM TINDEL.

Witnesses:
F. E. BECHTOLD,
JOS. H. KLEIN.